Patented July 2, 1929.

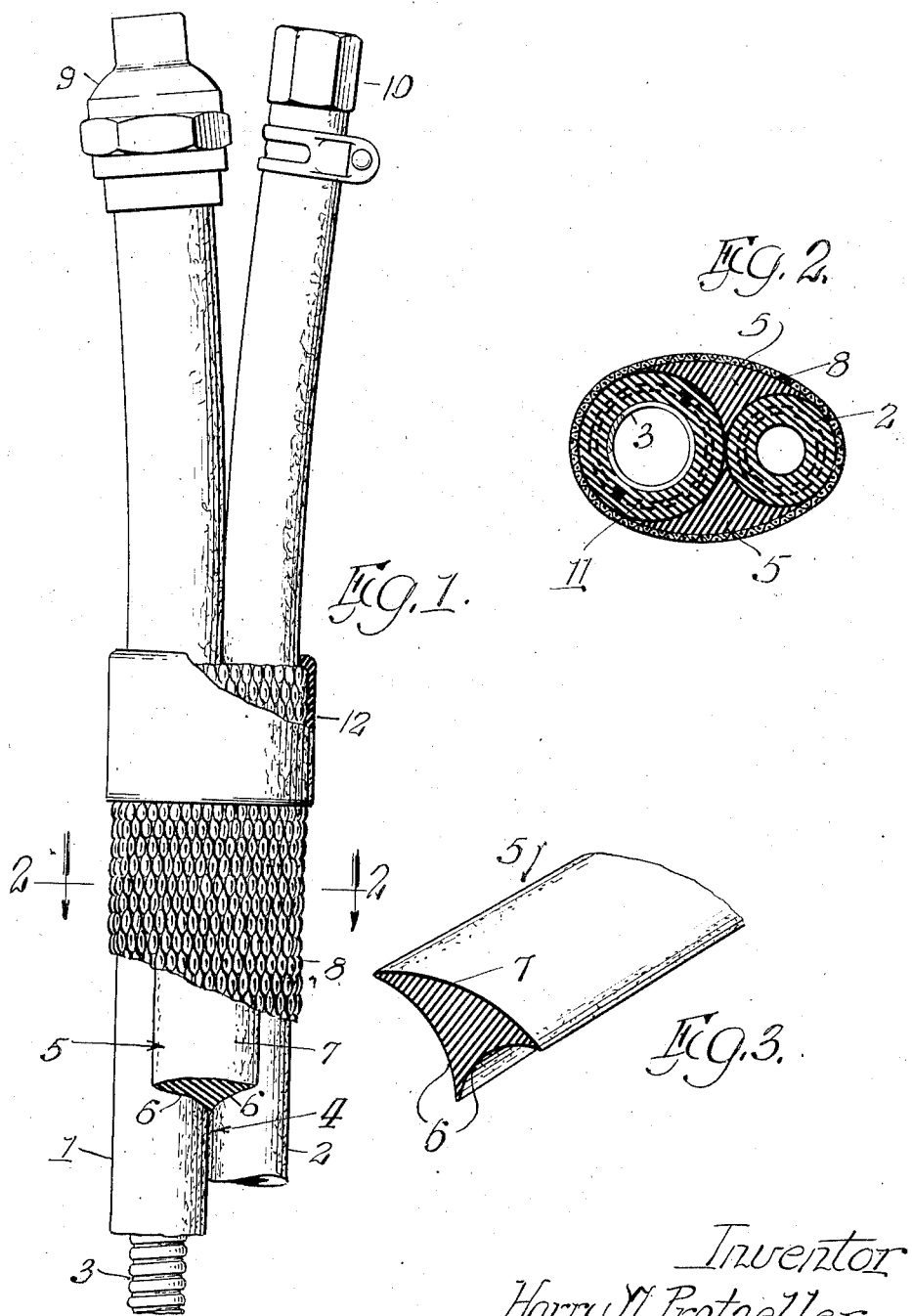

1,718,978

UNITED STATES PATENT OFFICE.

HARRY W. PROTZELLER, OF EAST CHICAGO, INDIANA, ASSIGNOR TO O. F. JORDAN COMPANY, OF EAST CHICAGO, INDIANA, A CORPORATION OF INDIANA.

DUPLEX HOSE.

Application filed February 23, 1927. Serial No. 170,297.

This invention relates to improvements in duplex hose and it consists of the matters hereinafter described and more particularly pointed out in the appended claims.

In many industries, certain operations require the conjoint use of a plurality of conduits and as an example thereof, may be mentioned the spraying of paint and the conduction of gases to welding apparatus and the like. Up to the present time a plurality of hoses are employed but this arrangement is far from satisfactory because they become entangled, they can not be readily coiled in the manner of a rope, they become collapsed when stepped upon and have other disadvantages well known. The present invention aims to overcome these inherent disadvantages and the primary object thereof is to provide a hose embodying therein a plurality of associated conduits arranged in close relation in a single structure, for convenient handling without danger of said conduits becoming entangled with each other.

A further object of the invention is to provide such a hose wherein the conduits are maintained in parallel relation by means secured to adjacent peripheral parts of the conduits and which fill out the valleys between such parts to impart a symmetrical cross sectional area to the hose as a whole which is then enclosed by a suitable covering or casing.

Still another object of the invention is to provide a hose of the kind made of independent flexible conduits secured together in close relation by valley fillers preferably vulcanized thereto and providing a cross sectional area upon which a snug fitting cover may be readily braided.

These objects of the invention as well as others, together with the many advantages thereof will more fully appear as I proceed with my specification.

In the drawings:

Fig. 1 is a view in side elevation of one end of a duplex hose embodying the preferred form of my invention, parts of the same being broken away to more clearly show the construction thereof.

Fig. 2 is a transverse section through the same as taken on the line 2—2 of Fig. 1.

Fig. 3 is a perspective view on an enlarged scale of a fragment of a filler strip embodied in my improved hose.

Referring now in detail to that embodiment of the invention illustrated in the accompanying drawings there is disclosed therein, one end of a duplex hose embodying my invention as employed in the spraying of paint. Herein 1 indicates the flexible tubular conduit leading from a source of paint or like material supply to a spray device and 2 indicates a similar conduit, leading from a source of air under pressure to said spray device. Preferably each conduit is in the form of a rubber or fabric hose of proper diameter, the conduit 1 being of a diameter larger than the conduit 2. If desired this hose may be provided with a flexible metallic tubular liner and the same is only generally shown at 3 in Fig. 1. My improved duplex hose is what may be termed a "built up" hose and in the manufacture of the duplex hose, the conduits 1 and 2 are placed in parallel position and in close engagement with each other except at one end thereof where they are preferably maintained separate for a purpose which will later appear. It is apparent that when the conduits are thus arranged a substantially triangular valley or groove will be formed by the adjacent peripheral portions of said conduits. In each valley or groove which is best shown at 4 in Fig. 1, I place a snugly fitting filler strip 5 preferably of raw rubber. As shown in Fig. 3 this filler strip is of substantially triangular cross section with two concaved sides 6—6 and a convexed inverted base 7, the said sides being concaved in accordance with the cross sectional contours of said conduits. After the filler strips are thus positioned in said valleys they are vulcanized to the conduits and the convexed base of the filler is so formed as to provide in connection with the oppositely disposed peripheral portions of the conduits a substantially symmetrical cross section for the duplex hose as a whole as best shown in Fig. 2. When the filler strips have been vulcanized to the conduits the conduits are securely held in close parallel relation or engagement and the whole is then enclosed by a flexible cover or casing 8. I find a convenient way to apply such a covering is to braid it on and in this manner it is not only seamless but is close fitting and provides a protection for the conduits and filler strips. In actual practice the covering is quite tightly braided so that the inner surface thereof becomes somewhat embedded in the surfaces of the conduits and filler strips so that the possibility of the cover twisting or slipping with respect to the conduits and filler strips is eliminated. This braiding may be treated with an oil or water or paint proof compound to increase the life of the braiding.

It is of course desirable to have those ends of the conduits to be attached to the devices with which they are used, formed as individual conduits each having a suitable coupling 9 and 10 respectively thereon, so that they may be readily attached to such devices. In such case the filler strips and cover terminate short of such ends as best shown in Fig. 1, and to prevent the unravelling of the braided cover I provide a raw rubber ferrule 13 to enclose the conduits and braiding which furrule is also vulcanized in place. This provides a finished end for the cover and prevents the tearing or disintegration of the cover under the action of the spreading apart of the exposed ends of the conduits to be attached to the spray or other device. A duplex hose made in accordance with my invention may be readily handled without kinking or entangling and may be readily reeled up and coiled up in the manner of a rope as is sometimes desirable. The filler strips not only secure the conduits together but also finish out a symmetrical cross section and act to resist any crushing strains as when stepped upon which would most probably collapse one or the other of the conduits.

While in describing my invention I have referred in great detail to the form, arrangement and construction of the various parts thereof, the same is to be considered as by way of illustration only so that I do not wish to be limited thereto except as may be pointed out in the appended claims.

I claim as my invention:

1. A duplex hose embodying therein a plurality of parallel tubular flexible conduits arranged in a closely adjacent relation, means secured to adjacent peripheral parts of said conduits to fill the valleys therebetween and a flexible cover enclosing said conduits and said means and engaging both of them.

2. A duplex hose embodying therein a plurality of parallel tubular flexible conduits arranged in a closely adjacent relation, a rubber member fitting adjacent peripheral portions of said conduits and securely attached thereto and a flexible cover enclosing said conduits and member.

3. A duplex hose embodying therein a plurality of parallel tubular flexible conduits arranged in a closely adjacent relation, rubber means fitting adjacent peripheral portions of said conduits and vulcanized thereto and a flexible cover enclosing said conduits and said rubber means.

4. A duplex hose embodying therein a plurality of parallel tubular flexible conduits arranged in a closely adjacent relation, rubber means fitting adjacent peripheral portions of said conduits and having surfaces building out a symmetrical cross section in connection with said conduits and a flexible cover braided upon and enclosing said conduits and rubber means.

5. A duplex hose embodying therein a plurality of parallel flexible tubular conduits arranged in contacting engagement, filler strips of rubber having concaved sides fitting adjacent peripheral portions of said conduits and having a third and convexed surface merging into other peripheral portions of the conduits, said filler strips being attached to said conduits and a textile cover braided upon said conduits and filler strips to enclose the same.

6. A duplex hose embodying therein a plurality of parallel flexible tubular conduits arranged in close relation, means engaged with and secured to adjacent peripheral portions of said conduits and terminating short of the ends of said conduits, a textile cover braided upon and enclosing said means and said conduits and terminating at the end of said means and a ferrule of rubber embracing the ends of said textile cover and vulcanized thereto.

In testimony whereof, I have hereunto set my hand, this 15th day of February, 1927.

HARRY W. PROTZELLER.